US006363925B1

(12) United States Patent
Chavana, Jr. et al.

(10) Patent No.: US 6,363,925 B1
(45) Date of Patent: Apr. 2, 2002

(54) CHARCOAL GRILL

(75) Inventors: **Ernest Matthew Chavana, Jr.;
Michael Giebel**, both of Joplin, MO
(US); Danene N. Jaffe, Weston, FL
(US); Mark Christopher Bates,
Westwood, MA (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 09/522,379

(22) Filed: Mar. 10, 2000

(51) Int. Cl.[7] ............................................... A47J 37/00
(52) U.S. Cl. ..................... 126/25 A; 126/25 R; 126/245
(58) Field of Search ............................ 126/25 R, 25 A, 126/25 AA, 9 R, 9 B, 29, 30, 242–245; 99/449, 450

(56) References Cited

U.S. PATENT DOCUMENTS

| | | | | |
|---|---|---|---|---|
| 1,102,392 A | * | 7/1914 | Denhard .................... | 126/25 A |
| 2,781,037 A | * | 2/1957 | Vuncannon ................ | 126/25 A |
| 3,276,440 A | * | 10/1966 | Sazegar ..................... | 126/25 A |
| 3,791,370 A | * | 2/1974 | Fauser ....................... | 126/25 A |
| 4,699,120 A | * | 10/1987 | Odgen ....................... | 126/25 A |
| 4,996,969 A | * | 3/1991 | Dodge ....................... | 126/25 R |
| 5,253,634 A | * | 10/1993 | LeBeouf .................... | 126/25 A |
| 5,797,386 A | * | 8/1998 | Orr ............................ | 126/25 A |
| 5,809,991 A | * | 9/1998 | Pai ............................. | 126/245 |

FOREIGN PATENT DOCUMENTS

| | | | | |
|---|---|---|---|---|
| JP | 8-80260 | * | 2/1996 | ................ 126/25 A |
| JP | 336468 | * | 12/1996 | ................ 126/25 A |

* cited by examiner

Primary Examiner—James C. Yeung
(74) Attorney, Agent, or Firm—Krammer Levin Nattalis & Frankel LLP

(57) ABSTRACT

A charcoal grill includes a mechanism whereby a user may adjust the vertical distance between a fuel grate and a cooking grid by rotating a control knob located on the surface of the charcoal grill. This mechanism provides a safer and more convenient way of adjusting the distance between the burning fuel and the food being cooked. The charcoal grill further includes a removable ash collector located at the bottom of the charcoal grill. To empty ash a user slides the ash collector out from its position at the bottom of the charcoal grill, empties it, and then replaces it to resume ash collection. Thus a user may conveniently dispose of ash without the use of an ash sweep tool and without interrupting operation. Furthermore the charcoal grill includes a metal skirt inside its lower shell, which protects the lower shell of the charcoal grill from excessive heat, lengthening its operational life.

13 Claims, 11 Drawing Sheets

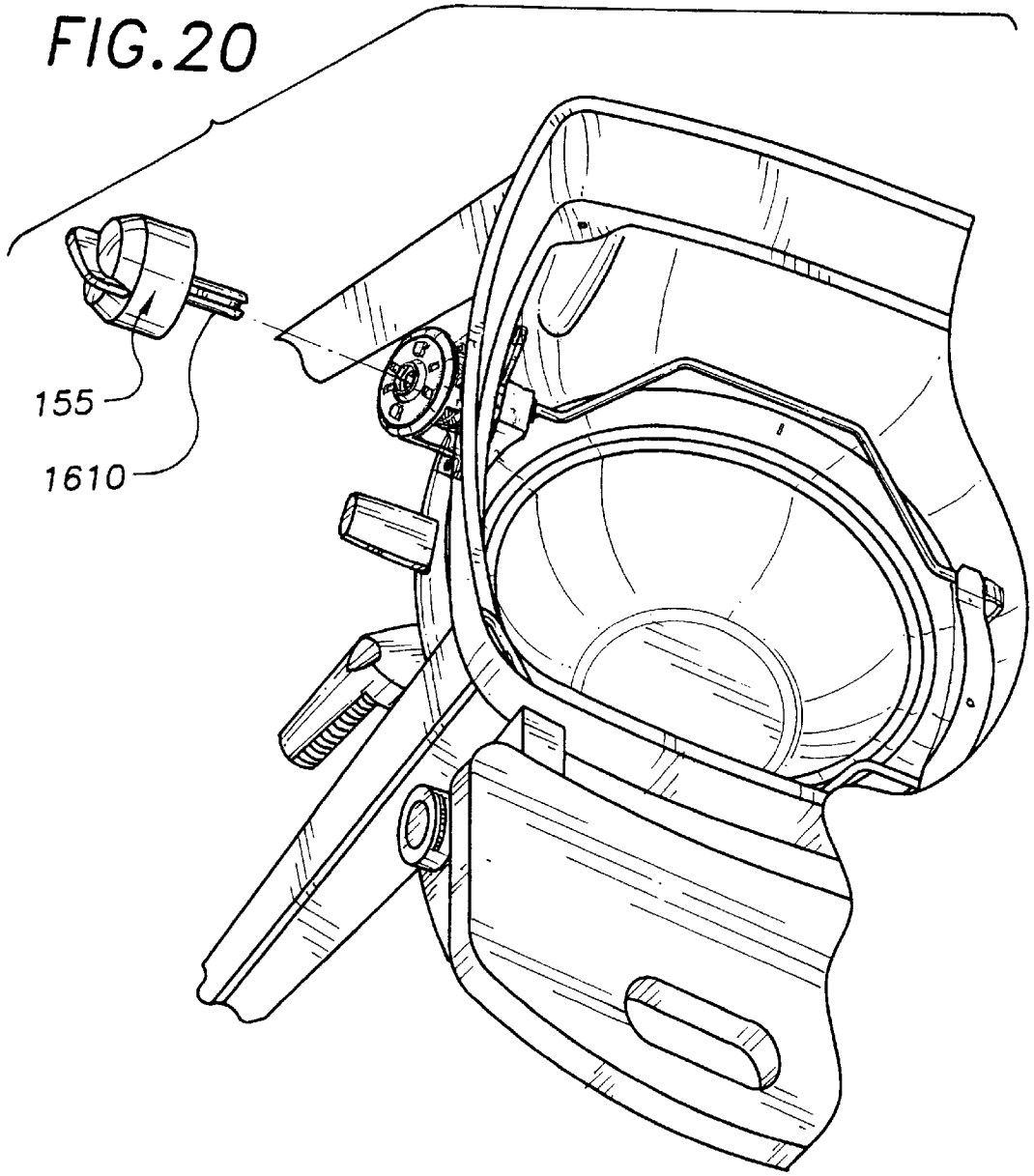

CHARCOAL GRILL

FIELD OF THE INVENTION

The present invention relates to grills, specifically to grills which generate cooking heat by burning combustible fuel such as charcoal or wood.

BACKGROUND INFORMATION

Grills have become seemingly ubiquitous fixtures at outdoor social gatherings, especially in warmer weather. Generally, grills commonly known as charcoal grills, cook food over a burning bed of fuel bits such as charcoal, and often include a lid used to cover the food and keep it warm.

Known charcoal grills provide various means for controlling temperature inside a charcoal grill. Some employ air vents, which regulate the flow of air through the charcoal grill and thereby control the rate at which the charcoal burns. However, air vents quickly become too hot to adjust during operation of the charcoal grill. Furthermore, air vents alone provide only the most rudimentary means of temperature control.

Other known charcoal grills control cooking temperature by making the distance between the burning coals and the food being cooked manually adjustable. Such charcoal grills employ lift mechanisms that adjust the height of a charcoal bearing grate without interrupting the operation of the charcoal grill. However, the lift mechanism found in such charcoal grills requires the user to physically lift a vertical column onto a series of vertical notches. This method is both inconvenient and dangerous. The lifting action requires a user to exert a certain degree of force, and exposes the user to a risk that the applied vertical force may cause the charcoal grill to tip or fall.

Ash builds up quickly during operation of a charcoal grill and excessive accumulation of ash will extinguish the burning coals. Disposing of ash while charcoal is still burning can be both inconvenient and hazardous. Known charcoal grills solve this problem by requiring the use of a sweeping tool to force ash through openings at the bottom of the charcoal grill. However, requiring the use of any additional tool makes a charcoal grill less portable and less convenient to use.

During ordinary use, the body of a charcoal grill is quickly and repeatedly reheated to high temperatures. Often, the charcoal grill is also quickly cooled, by dousing it with water, for example. Such rapid and extreme changes in temperature over time eventually result in damage to the body of a charcoal grill, such as cracks or fading of color. To lengthen the operational life of a charcoal grill, the design of the charcoal grill must provide the body of the charcoal grill with some protection against excessive temperature changes.

Thus, there exists a need in the art for a safer and more convenient way of adjusting the distance between the burning fuel and the food being cooked. Furthermore, there exists a need in the art for a more convenient way of disposing of ash during operation that does not require the use of an ash sweep tool. There also exists a need in the art for a feature that protects the body of a grill from excessive temperature changes.

SUMMARY OF THE INVENTION

A grill according to an exemplary embodiment of the present invention provides a fuel grate lift mechanism, whereby a user may adjust the vertical distance between a fuel grate and a cooking grid by rotating a control knob located on the surface of the charcoal grill. This mechanism provides a safer and more convenient way of adjusting the distance between the burning fuel and the food being cooked.

An embodiment of the present invention further provides a removable ash collector located at the bottom of a charcoal grill. To empty ash a user slides the ash collector out from its position at the bottom of the charcoal grill, empties it, and then replaces it to resume ash collection. Thus a user may conveniently dispose of ash without the use of an ash sweep tool and without interrupting operation.

Furthermore a charcoal grill according to an embodiment of the present invention incorporates a metal skirt inside its lower shell, which protects the lower shell of the charcoal grill from excessive heat, lengthening its operational life.

BRIEF DESCRIPTION OF THE DRAWINGS

FIG. 20 illustrates a top view of the inside of a bottom shell of a grill according to an exemplary embodiment of the present invention.

DETAILED DESCRIPTION OF THE INVENTION

Various aspects of the present invention will be described, and for purposes of explanation, specific configurations and details are set forth in order to provide a thorough understanding of the present invention. However, it will be apparent to one skilled in the art that the present invention may be practiced without these specific details. Furthermore, well known features have been omitted or simplified in order to prevent obscuring the present invention.

Figure 1:
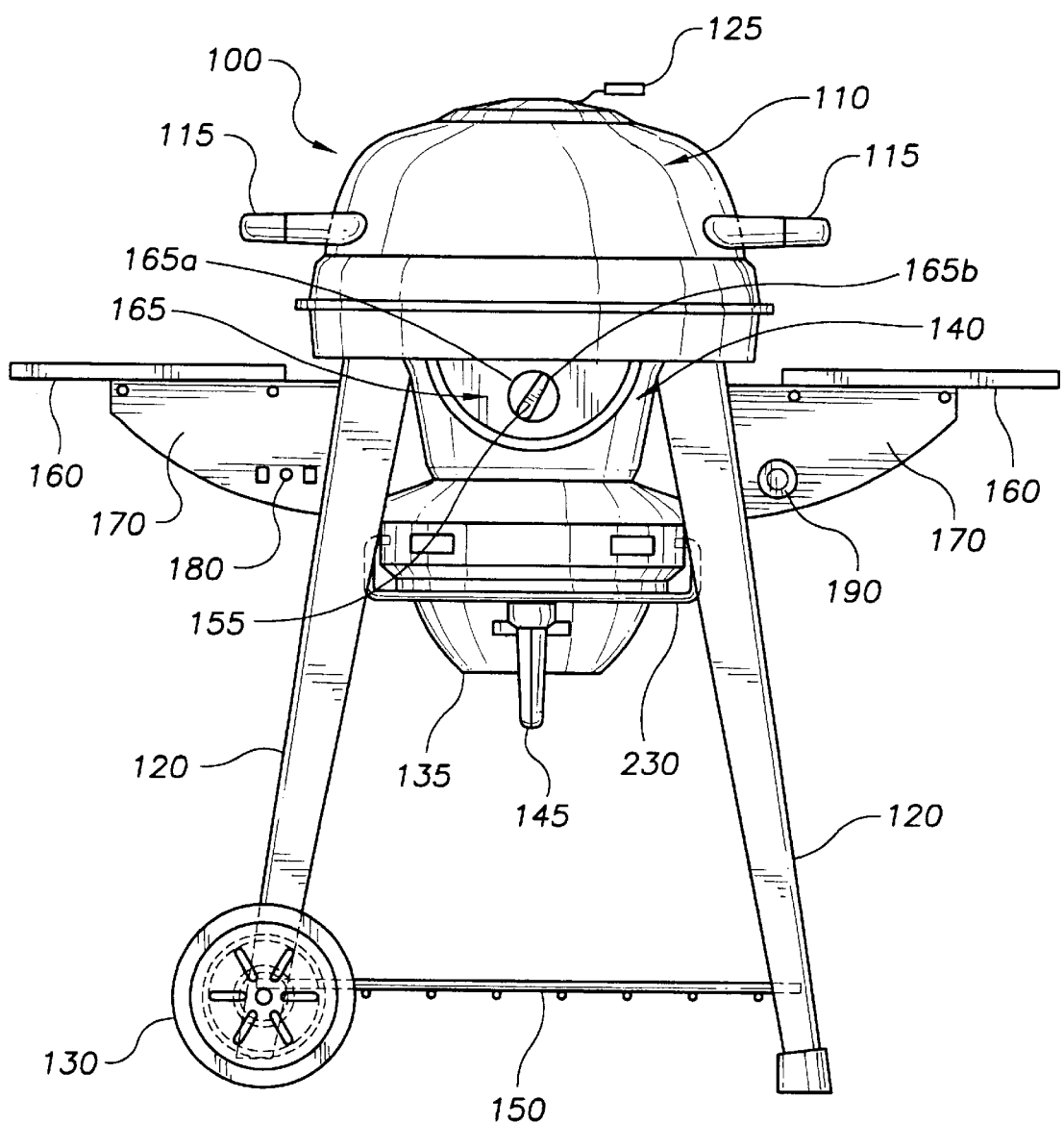
FIG. 1 illustrates a front view of a grill according to an exemplary embodiment of the present invention.

FIG. 1 illustrates a front view of a grill according to an exemplary embodiment of the present invention. Referring to FIG. 1, a grill 100 according to an exemplary embodiment of the present invention generates heat for cooking food by burning fuel members such as, for example, charcoal, wood, or other suitable combustible fuel. Preferably, the main body of grill 100 is comprised of a bottom shell 140 movably coupled via a conventional hinge mechanism 210 to a lid 110. Both bottom shell 140 and lid 110 may be formed from steel or other metal alloys.

Figure 3:
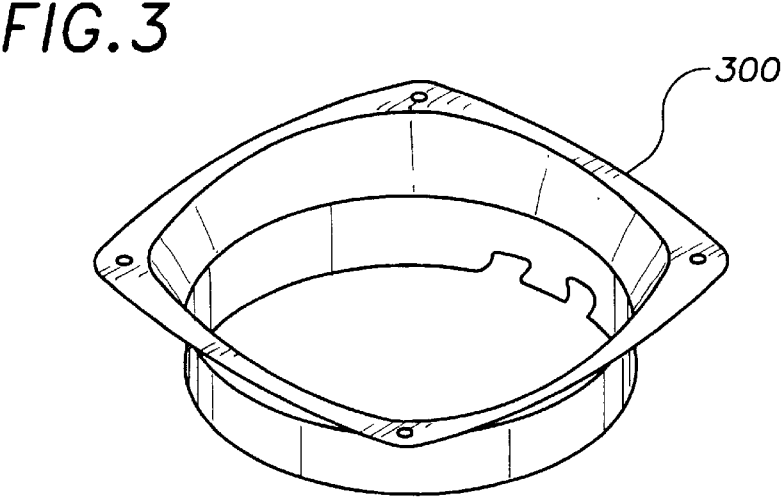
FIG. 3 illustrates a liner of a grill according to an exemplary embodiment of the present invention.
Figure 7:
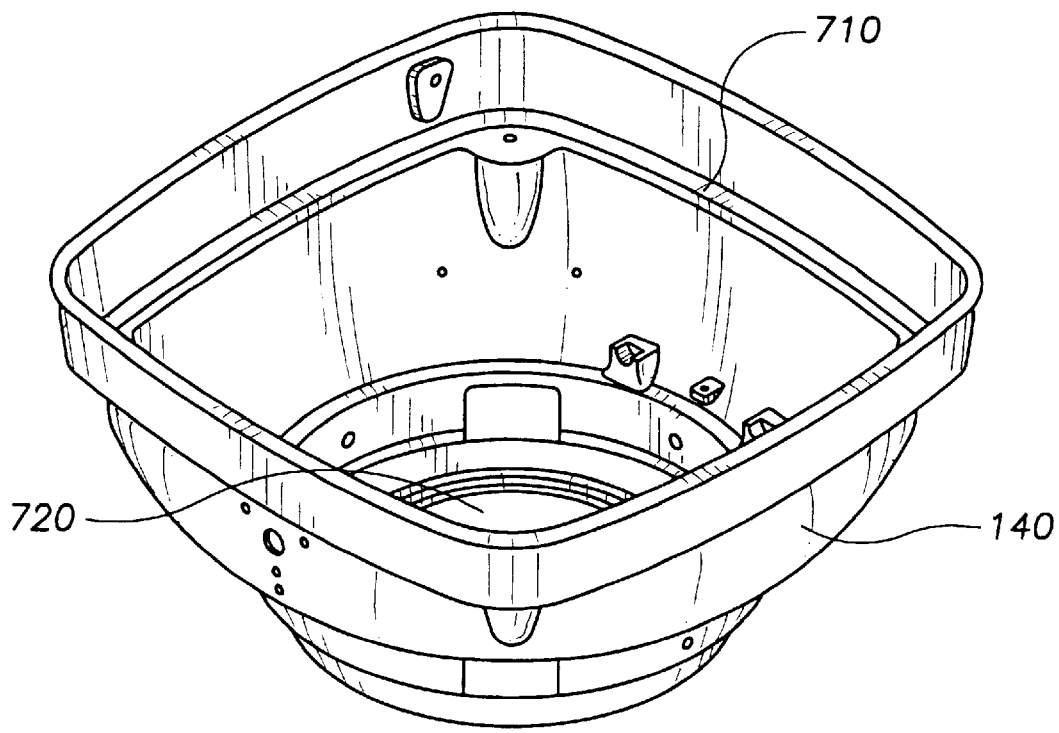
FIG. 7 illustrates a bottom shell of a grill according to an exemplary embodiment of the present invention.

FIG. 3 illustrates a liner of a grill according to an exemplary embodiment of the present invention. FIG. 7 illustrates a bottom shell of a grill according to an exemplary embodiment of the present invention. Referring to FIGS. 3 and 7, liner 300 made from aluminum or another metal alloy or from a porcelain coated metal alloy, is inserted into bottom shell 140 and rigidly coupled to flanged edge 710 inside bottom shell 140. Liner 300 protects bottom shell 140 from excessive heat, reducing wear and fading of color.

Bottom shell 140 rests on, for example, four legs 120 made from aluminum or another metal alloy, which are rigidly coupled, for example, to a middle portion of bottom shell 140. For increased portability, wheels 130 may be coupled to the bottom portion of two or more of legs 120. Wire base 150 made, for example, from metal wire is coupled to a bottom portion of legs 120 and adds to the stability of legs 120 by counteracting the tendency of legs 120 to spread outward due to the weight of charcoal grill 100.

One or more side tables 160 made, for example, from pressed wood board, are rigidly coupled to side table brackets 170 which are in turn laterally disposed and are, for example, rigidly coupled to legs 120 but may be rigidly coupled to bottom shell 140. In alternative embodiments, side tables 160 or side table brackets 170 may be made collapsible using a conventional lockable hinge mechanism. A side table bracket 170 may have a meat probe receptacle 180 for storing, for example, a meat thermometer 190.

In an exemplary embodiment of the present invention, one or more handles 115 made, for example, from plastic or any other poor conductor of heat, may be used for raising lid 110 away from bottom shell 140. Handles 115 are rigidly coupled to and, for example, laterally disposed to, lid 110. A top vent 410 is disposed at the approximate top of lid 110 and is manually adjustable to increase or decrease the flow of air through the inside of charcoal grill 100.

Figure 4:
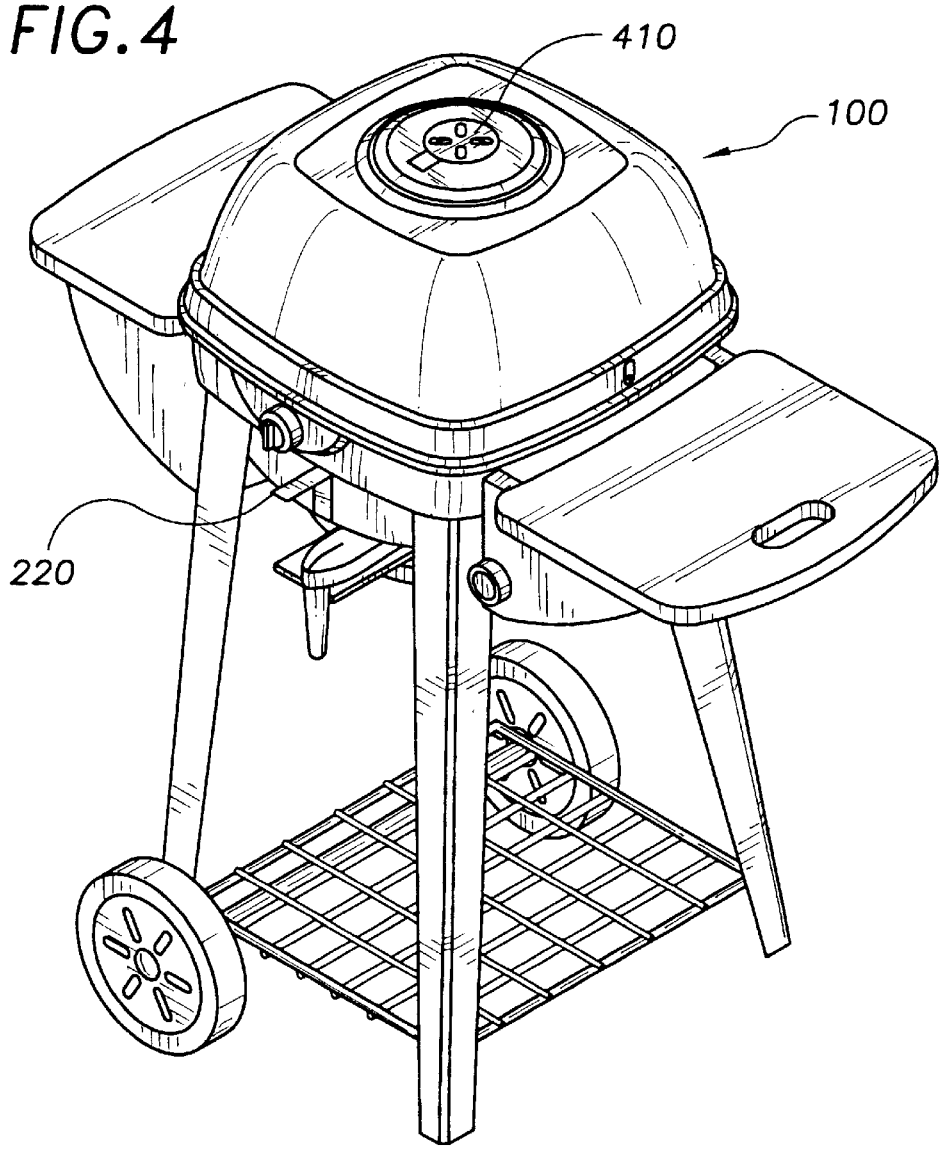
FIG. 4 illustrates a perspective view of a grill according to an exemplary embodiment of the present invention.
Figure 5:
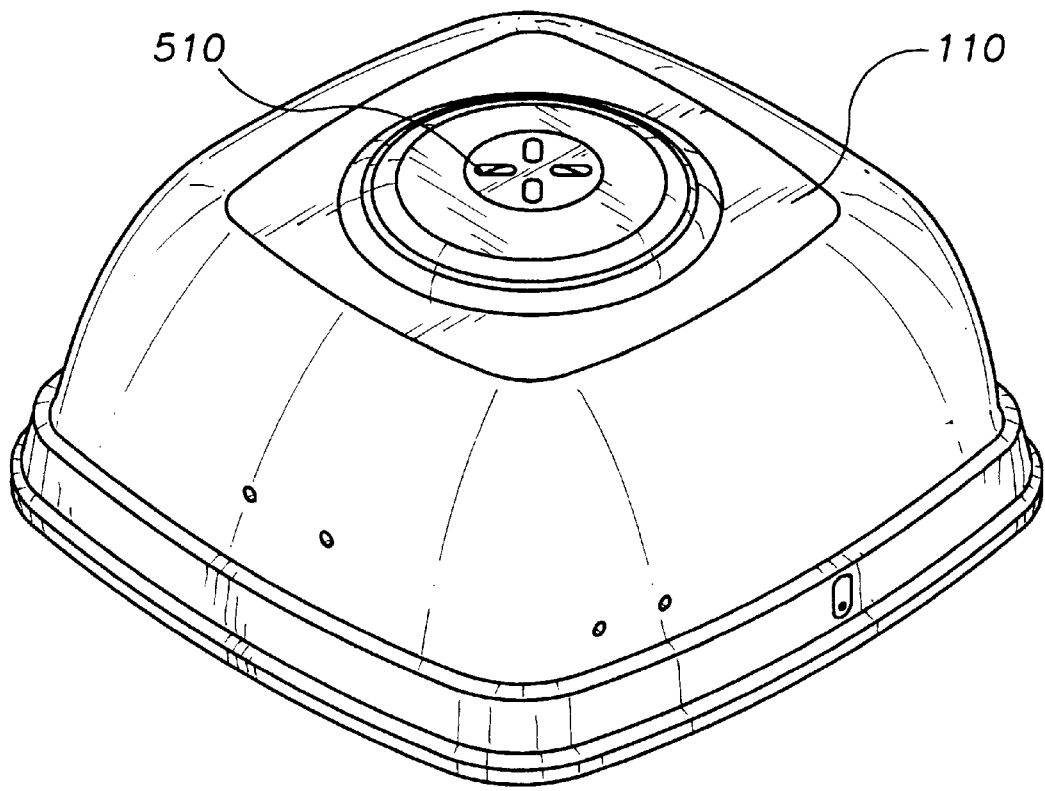
FIG. 5 illustrates a lid of a grill according to an exemplary embodiment of the present invention.
Figure 6:
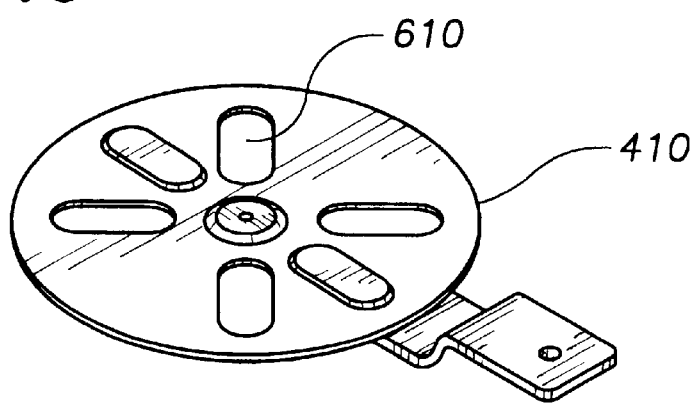
FIG. 6 illustrates a top vent of a grill according to an exemplary embodiment of the present invention.

FIG. 4 illustrates a perspective view of a grill according to an exemplary embodiment of the present invention. FIG. 5 illustrates a lid of a grill according to an exemplary embodiment of the present invention. FIG. 6 illustrates a top vent of a grill according to an exemplary embodiment of the present invention. Referring to FIGS. 4, 5, and 6, both lid 110 and top vent 410 are perforated with, for example, similar patterns of vent openings 510, 610. Top vent 410 is movably coupled to the perforated area 510 of lid 110 such that each rotates with respect to the other along the same plane. Air flow through charcoal grill 100 may be increased by rotating top vent 410 until its vent openings 610 are substantially in line with corresponding vent openings 510 in lid 110. Similarly, air flow may be blocked by positioning the corresponding vent openings 510, 610 so that they are not in line with one another. A top vent handle 125 made, for example, from plastic or any other poor conductor of heat, may be used to adjust top vent 410.

Figure 8:
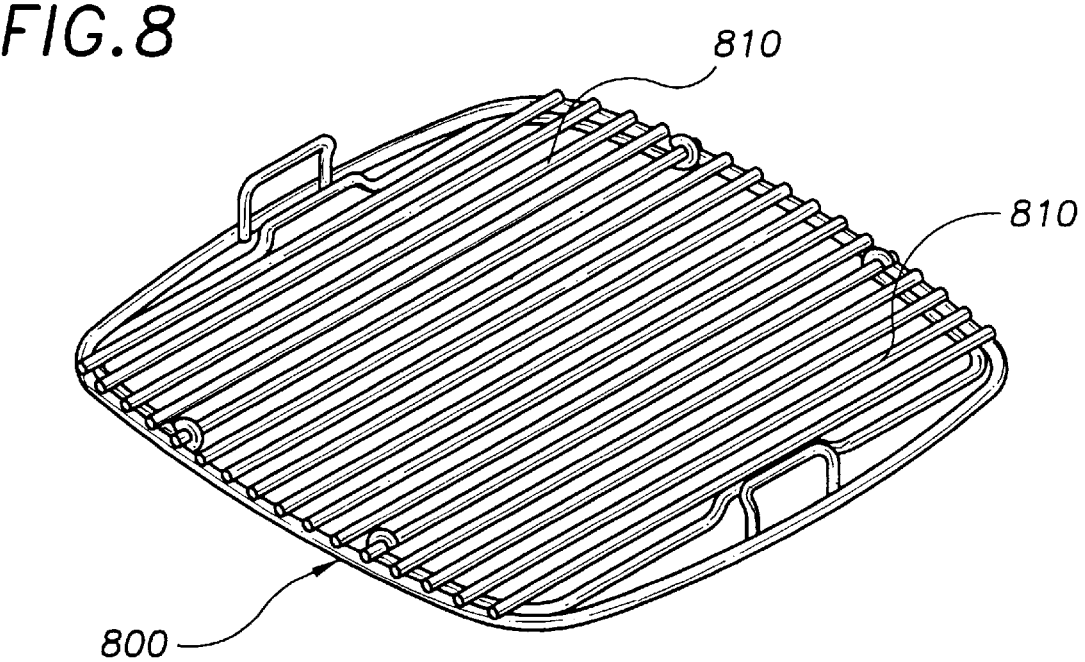
FIG. 8 illustrates a cooking grid of a grill according to an exemplary embodiment of the present invention.
Figure 9:
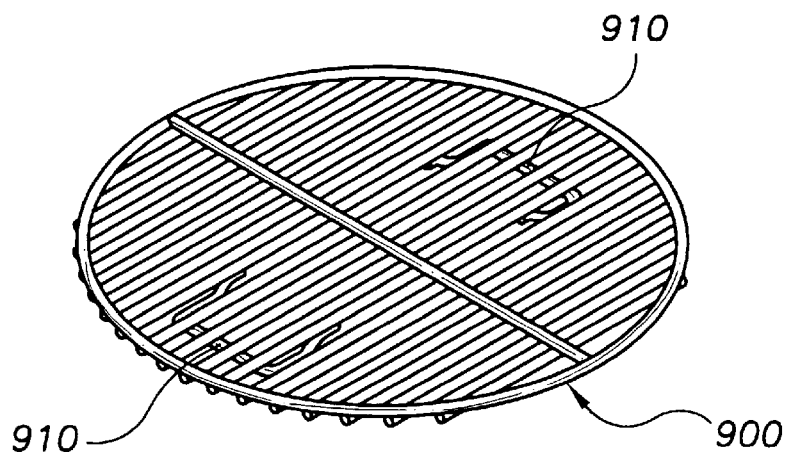
FIG. 9 illustrates a coal grate of a grill according to an exemplary embodiment of the present invention.

FIG. 7 illustrates a bottom shell of a grill according to an exemplary embodiment of the present invention. FIG. 8 illustrates a cooking grid of a grill according to an exemplary embodiment of the present invention. FIG. 9 illustrates a coal grate of a grill according to an exemplary embodiment of the present invention. Referring to FIGS. 7, 8, and 9, cooking grid 800 lies inside bottom shell 140, supported by, for example, a ledge formed by a flanged edge 710 of bottom shell 140. Cooking grid 800 may have a hinged portion 810 that may be raised or lifted, permitting access to fuel grate 900 in order to, for example, add more fuel without interruption of cooking.

Both cooking grid 800 and fuel grate 900 are constructed, for example, from pieces of evenly spaced metal wire. Ash formed by the burning fuel on fuel grate 900 falls through the spaces between the metal wire comprising fuel grate 900 to an opening in the lower portion of bottom shell 140 underneath fuel grate 900. The fuel burned on fuel grate 900 may be, for example, charcoal but may also be another combustible material such as, for example, wood.

Figure 10:
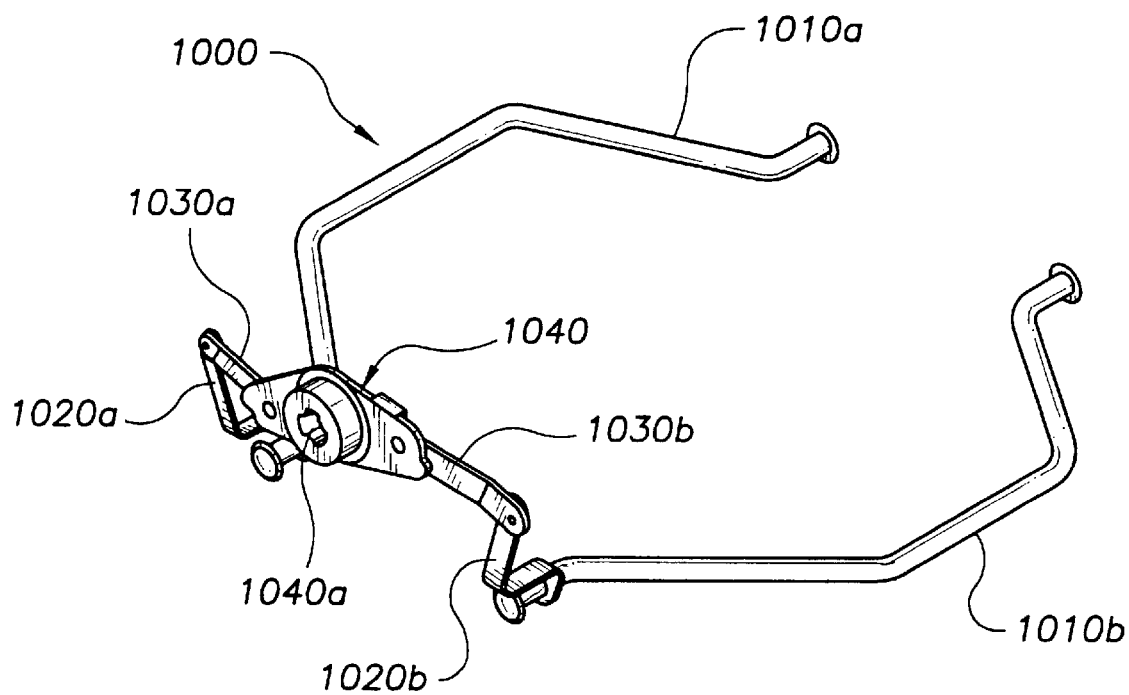
FIG. 10 illustrates a grate lift mechanism of a grill according to an exemplary embodiment of the present invention.
Figure 11:
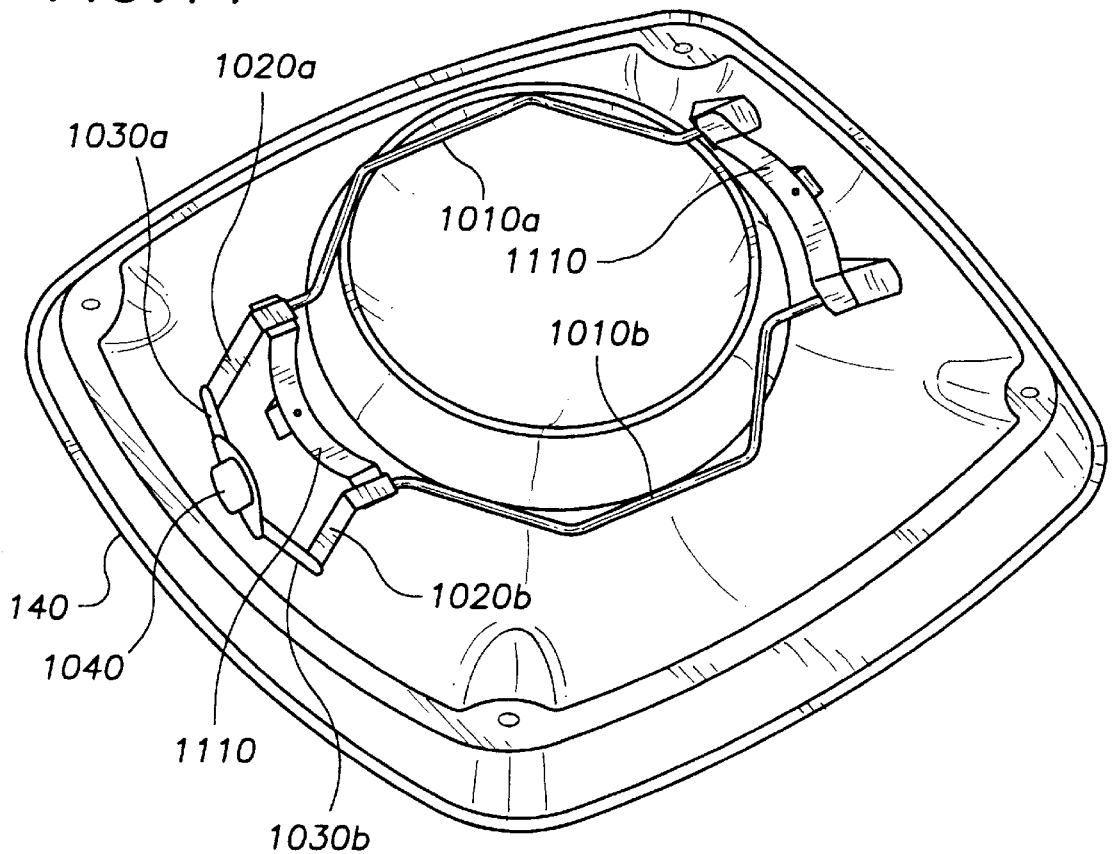
FIG. 11 illustrates a top view of the inside of a bottom shell of a grill according to an exemplary embodiment of the present invention.

FIG. 9 illustrates a coal grate of a grill according to an exemplary embodiment of the present invention. FIG. 10 illustrates a grate lift mechanism of a grill according to an exemplary embodiment of the present invention. FIG. 11 illustrates a top view of the inside of a bottom shell of a grill according to an exemplary embodiment of the present invention. Referring to FIGS. 9, 10, and 11, fuel grate 900 lies on grate lift wires 1010a, 1010b inside bottom shell 140 disposed underneath and in a plane substantially parallel to cooking grid 800. Grate lift wires 1010a, 1010b according to an embodiment of the present invention, slide freely along the bottom of fuel grate 900. U-shaped wires 910 underneath fuel grate 900 act as hooks for grate lift wires 1010a, 1010b. When grate lift wires 1010a, 1010b are in, for example, the high position, they hook onto U-shaped wires 910 to prevent the fuel grate 900 from tipping during operation of the grate lift mechanism.

Figure 2:
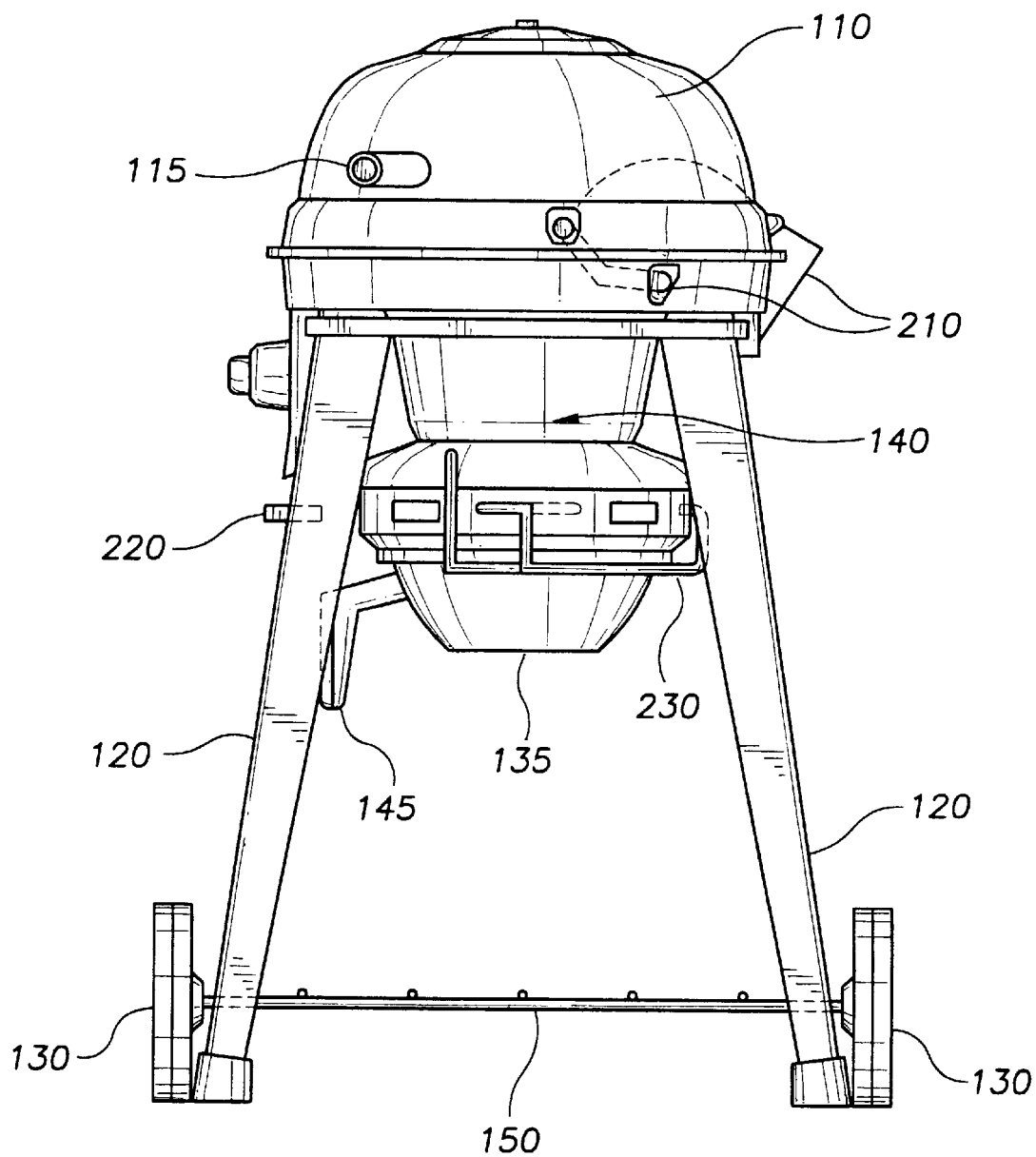
FIG. 2 illustrates a side view of a grill according to an exemplary embodiment of the present invention.
Figure 12:
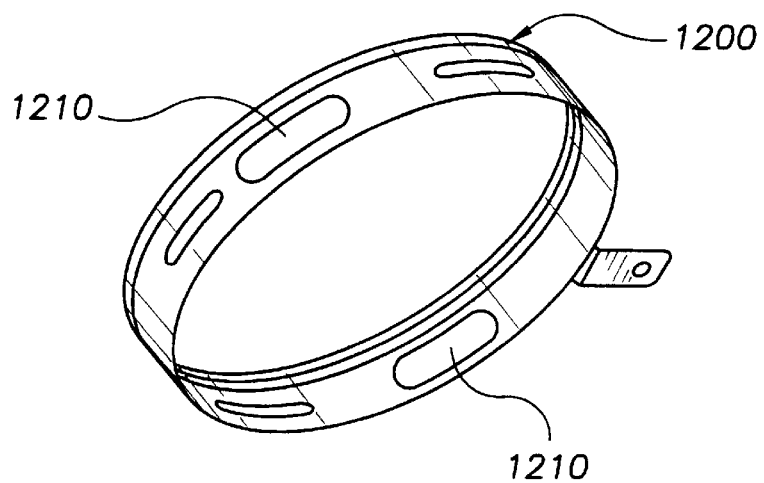
FIG. 12 illustrates a vent ring of a grill according to an exemplary embodiment of the present invention.
Figure 13:
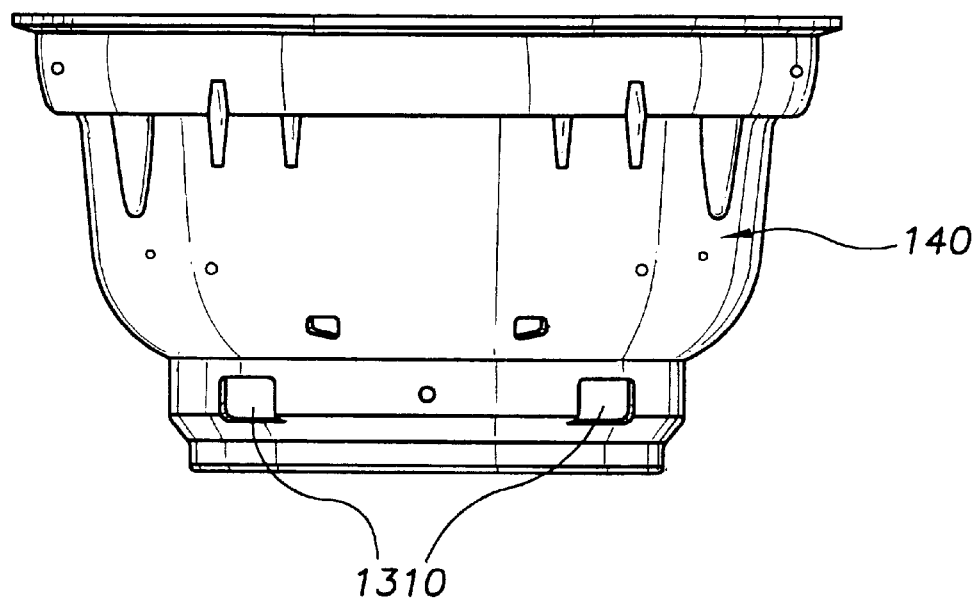
FIG. 13 illustrates a side view of a bottom shell of a grill according to an exemplary embodiment of the present invention.

FIG. 12 illustrates a vent ring of a grill according to an exemplary embodiment of the present invention. FIG. 13 illustrates a side view of a bottom shell of a grill according to an exemplary embodiment of the present invention. Referring to FIGS. 12 and 13, vent ring 1200 located at the lower portion of bottom shell 140 functions in a manner similar to top vent 410. A cylindrical lower portion of bottom shell 140 is perforated with bottom shell vent openings 1310. A vent ring 1200, perforated with a matching pattern of vent ring openings 1210, is movably coupled to the cylindrical lower portion of bottom shell 140. By rotating vent ring 1200, bottom shell vent openings 1310 and vent ring openings 1210 may be moved into and out of line with each other, respectively increasing or decreasing air flow through grill 100. Referring to FIGS. 2 and 4, a vent ring handle 220 made, for example, from plastic or any such poor conductor of heat, may be used to adjust vent ring 1200.

Figure 14:
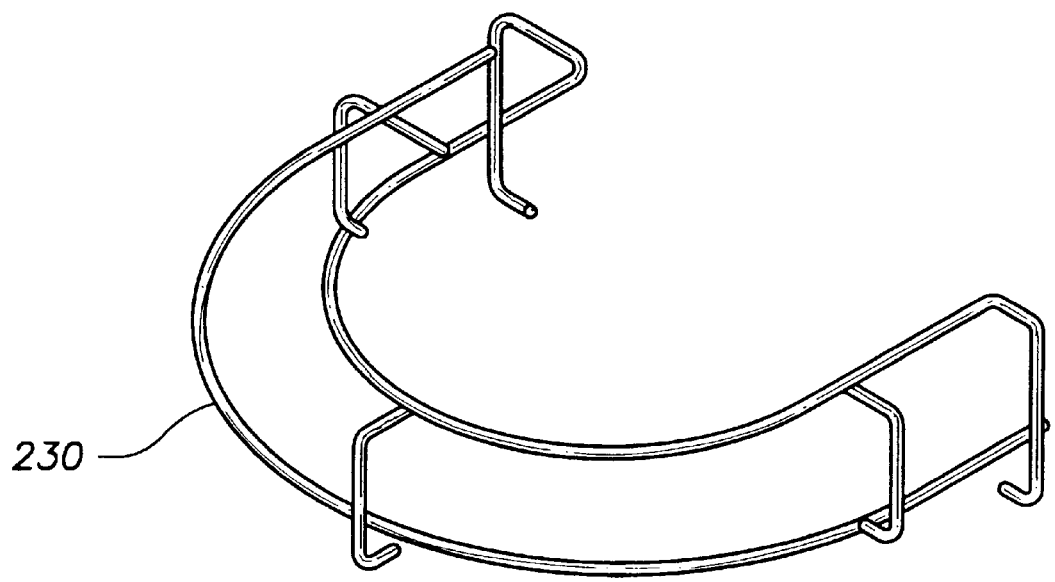
FIG. 14 illustrates an ash pan support wire of a grill according to an exemplary embodiment of the present invention.

FIG. 14 illustrates an ash pan support wire or a grill according to an exemplary embodiment of the present invention. Referring to FIGS. 1, 2, and 14, ash pan support wire 230 is coupled to bottom shell 140 by flexing the ash pan support wire 230 and guiding the ends of the wire through holes in bottom shell 140.

Figure 15:
FIG. 15 illustrates a cross-sectional view of an ash pan of a grill according to an exemplary embodiment of the present invention.

FIG. 15 illustrates a cross-sectional view of an ash pan of a grill according to an exemplary embodiment of the present invention. Referring to FIGS. 1 and 15, ash pan 135 has a flanged rim 1510 via which ash pan 135 rests on ash pan support wire 230 and along which ash pan 135 slides freely. To secure slidable ash pan 135 to ash pan support wire 230 the diameter of ash pan 135 is embossed to be thicker near ash pan handle 145, creating a snug fit with ash pan support wire 230. Alternative methods for securing ash pan 135 to ash pan support wire 230 may also be employed, such as a spring activated catch.

Ash pan 135 may be made, for example, from aluminum or another metal alloy. Ash pan 135 is placed directly under the open bottom portion of bottom shell 140 and collects ash as it falls through fuel grate 900 into open bottom portion 720 depicted in FIG. 7.

Ash pan handle 145 may be made, for example, from plastic or any such poor conductor of heat and may be used to slide ash pan 135 out from ash pan support wire 230 in order to empty ash pan 135. Once emptied, ash pan 135 slides back into place along ash pan support wire 230. Thus ash pan 135 provides a convenient way of disposing of ash and debris without interrupting operation of grill 100.

Fuel grate 900 may be lifted and lowered by grate lifting mechanism 1000 as is depicted in FIG. 10. Grate lift mechanism 1000 consists of, for example, a grate lift wire 1010a permanently coupled to one end of grate lift wire arm 1020a. Another end of grate lift wire arm 1020a is pivotally connected to one end of a left grate lift link 1030a, the other end of which is pivotally connected to one end of a grate lift pivot arm 1040. Pivotally connected to the other end of a grate lift pivot arm 1040 is one end of grate lift link 1030b, which is in turn permanently connected to one end of grate lift wire arm 1020b. The other end of grate lift wire arm 1020b is pivotally connected to one end of a grate lift wire 1010b.

Referring to FIG. 11, grate lift wire retainer brackets 1110 made, for example, from aluminum or another metal alloy, are rigidly coupled to bottom shell 140 and hold grate lift wires 1010a, 1010b in position while allowing grate lift wires 110a, 1010b to rotate freely.

Figure 16:
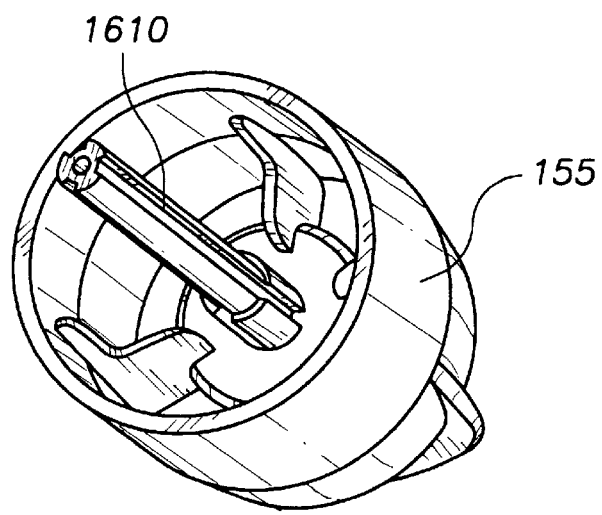
FIG. 16 illustrates the inside of a control knob of a grill according to an exemplary embodiment of the present invention.
Figure 17:
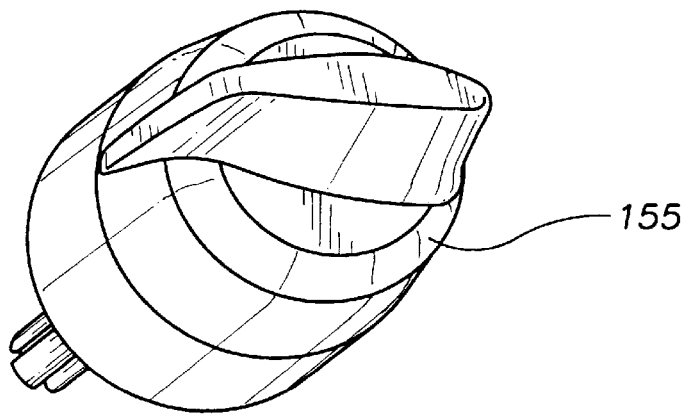
FIG. 17 illustrates the front of a control knob of a grill according to an exemplary embodiment of the present invention.

FIG. 16 illustrates the inside of a control knob of a grill according to an exemplary embodiment of the present invention. FIG. 17 illustrates the front of a control knob of a grill according to an exemplary embodiment of the present invention. FIGS. 1, 16 and 17 illustrate control knob 155. Referring to FIGS. 16 and 10, a control knob shaft 1610 is rigidly coupled to, for example, a notched opening 1040a at center of grate lift pivot arm 1040. Notched opening 1040a matches grooved portions of control knob shaft 1610 such that rotation of control knob 155 rotates grate lift pivot arm 1040.

Referring to FIG. 1, rotation of control knob 155 to, for example, high position 165a, causes grate lift pivot arm 1040 to similarly rotate about its center in the same direction. Grate lift links 1030a, 1030b are pivotally connected to opposite ends of grate lift pivot arm 1040. Thus rotation of grate lift pivot arm 1040 about its center necessarily pulls both grate lift links 1030a, 1030b in opposite directions and towards one other. Grate lift links 1030a, 1030b acting as levers, raise grate lift wires 1010a, 1010b upon which fuel grate 900 rests. Thus fuel grate 900 is lifted closer to cooking grid 800 intensifying the cooking heat.

Figure 18:
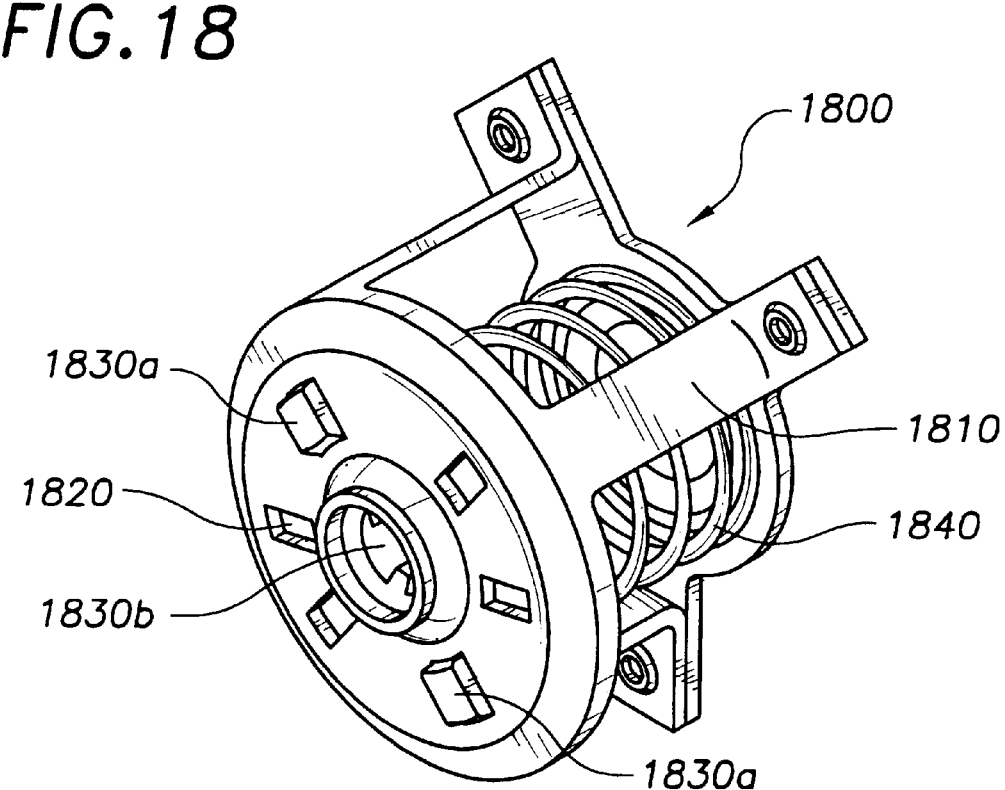
FIG. 18 illustrates a grate lock of a grill according to an exemplary embodiment of the present invention.
Figure 19:
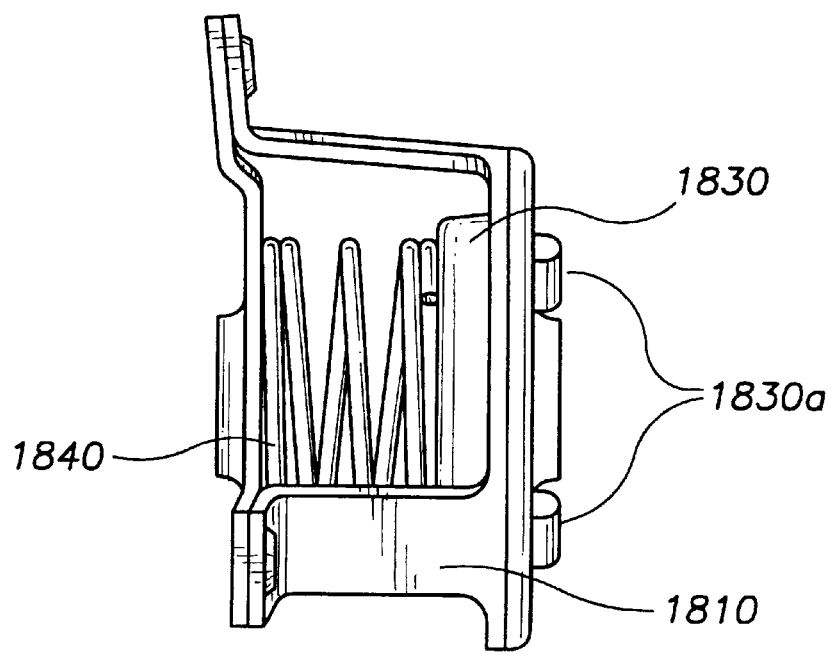
FIG. 19 illustrates a side view of a grate lock of a grill according to an exemplary embodiment of the present invention.

FIG. 18 illustrates a grate lock of a grill according to an exemplary embodiment of the present invention. FIG. 19 illustrates a side view of a grate lock of a grill according to an exemplary embodiment of the present invention. FIG. 20 illustrates a top view of the inside of a bottom shell of a grill according to an exemplary embodiment of the present invention. Grate lock 1800, according to an embodiment of the present invention, is a mechanism for locking grate lift wires 1010a and 1010b in position. Referring to FIGS. 18, 19, and 20 there are openings at both ends of grate lock 1800 through which a control knob shaft 1610 is inserted. One end of the grate lock housing 1810 has small grate lock perforations 1820. Inside grate lock housing 1810 a grate lock spring 1840 pushes a rotatable grate lock index disc 1830 firmly against the inside portion of the grate lock perforations 1820 of grate lock housing 1810. Grate lock index disc teeth 1830a fit into grate lock perforations 1820 in grate lock housing 1810.

Control knob shaft 1610 is inserted through openings in grate lock housing 1810 and notched opening 1830b in the center of grate lock index disc 1830. Notched opening 1830b matches grooved portions of control knob shaft 1610 such that rotation of control knob 155 rotates grate lock index disc 1830.

FIG. 18 depicts grate lock 1800 in a locked position. Grate lock index disc teeth 1830a are engaged, jutting through grate lock perforations 1820. To disengage grate lock index disc teeth 1830a force must be applied to teeth 1830a sufficient to compress grate lock spring 1840. Once grate lock index disc teeth 1630a are disengaged from grate lock perforations 1820, grate lock index disc 1830 is free to rotate.

To raise fuel grate 900, a user must first push control knob 155 forward to disengage grate lock 1800. Then, a user must rotate control knob 155 in the appropriate direction as indicated on control panel 165. As has already been described, this action rotates the grate lift pivot arm 1040, which pulls the grate lift links 1030a, 1030b towards each other and in opposite directions, raising grate lift wires 101a and 1010b upon which fuel grate 900 rests. A user must continue to rotate control knob 155 until grate lock index disc teeth 1830a engage with grate lock perforations 1820, placing the grate lock 1800 in a locked position and thus holding control knob 155 and grate lift wires 1010a, 1010b in locked position.

To lower fuel grate 900 a user must first push control knob 155 forward to disengage grate lock 1800. Then a user must rotate control knob 155 in the appropriate direction as indicated by control panel 165. Rotation of control knob 155 combined with the weight of fuel grate 900 rotates grate lift pivot arm 1040 and pushes grate lift links 1030a, 1030b in opposite directions and away from one another, further causing grate lift wires 1010a and 1010b to fall back to a lower position. This action continues until grate lock index disc teeth 1830a engage with a set of corresponding grate lock perforations 1820 placing grate lock 1800 in a locked state.

What is claimed is:
1. A grill, comprising:
a bottom shell portion;
an ash collector portion depending from the bottom shell portion;
a fuel grate for holding fuel disposed inside the bottom shell portion;

a grate lifting mechanism for adjusting the vertical position of the fuel grate; and a control knob, the control knob being coupled to a pivot arm of the grate lifting mechanism, wherein movement of the pivot arm of the grate lifting mechanism adjusts the vertical position of the fuel grate in accordance with an activation of the control knob; and wherein the grate lifting mechanism comprises a first and a second plurality of pivotally coupled members, the first and the second plurality of pivotally coupled members being pivotally coupled to opposing sides of the pivot arm.

2. The grill according to claim 1, wherein a skirt is coupled to the bottom shell portion and disposed between the bottom shell and the area in which fuel is burned.

3. The grill according to claim 1, comprising a lid portion.

4. The grill according to claim 3, wherein one or more handles are coupled to the lid portion.

5. The grill according to claim 3, wherein the lid portion has an adjustable top vent portion.

6. The grill according to claim 1, wherein the bottom shell has an adjustable vent ring portion.

7. The grill according to claim 1, wherein the ash collector portion is releasably lockable.

8. The grill according to claim 1, comprising a cooking grid disposed above the fuel grate.

9. The grill according to claim 8, wherein the cooking grid has a raisable hinged portion.

10. The grill according to claim 1, wherein the control knob is located on the surface of the grill.

11. The grill according to claim 1, wherein the activation of the control knob includes a rotation of the control knob.

12. A grill, comprising:

a bottom shell portion;

an ash collector portion depending from the bottom shell portion;

a fuel grate for holding fuel disposed inside the bottom shell portion;

a grate lifting mechanism for adjusting the vertical position of the fuel grate; and a control knob, the control knob being coupled to the grate lifting mechanism, wherein the grate lifting mechanism adjusts the vertical position of the fuel grate in accordance with an activation of the control knob;

wherein the grate lifting mechanism comprises:

a first grate lift wire and a second grate lift wire;

a first grate lift wire arm and a second grate lift wire arm, wherein the first grate lift wire arm is rigidly coupled to the first grate lift wire, and the second grate lift wire arm is rigidly coupled to the second grate lift wire;

a first grate lift link and a second grate lift link, wherein the first grate lift link is pivotally coupled to the first grate lift wire arm, and the second grate lift link is pivotally coupled to the second grate lift wire arm;

a grate lift pivot arm, wherein the first grate lift link and the second grate lift link are pivotally coupled to the grate lift pivot arm, wherein the control knob is rigidly coupled to the grate lift pivot arm; and a grate lock.

13. The grill according to claim 2, wherein the grate lock comprises:

a grate lock housing;

a toothed grate lock index disc; and a grate lock spring.

\* \* \* \* \*